S. F. NICHOLS.
MOTOR OPERATED BRAKE MECHANISM.
APPLICATION FILED MAY 23, 1910.
1,029,883.
Patented June 18, 1912.
2 SHEETS—SHEET 1.
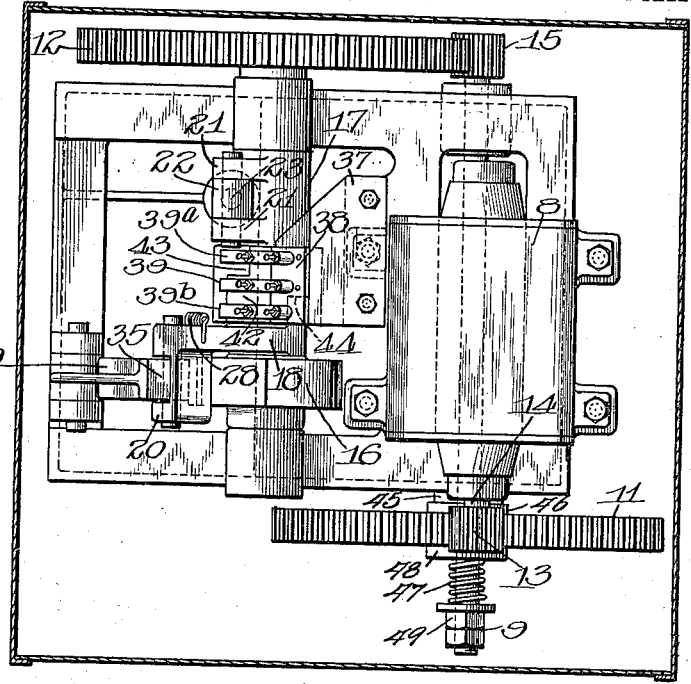

S. F. NICHOLS.
MOTOR OPERATED BRAKE MECHANISM.
APPLICATION FILED MAY 23, 1910.
1,029,883.
Patented June 18, 1912.
2 SHEETS—SHEET 2.
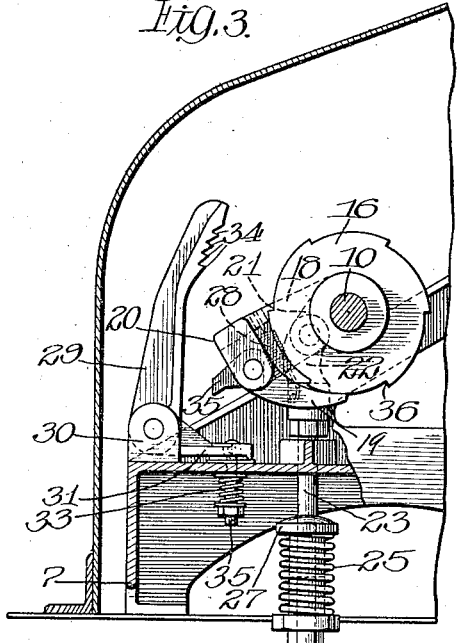
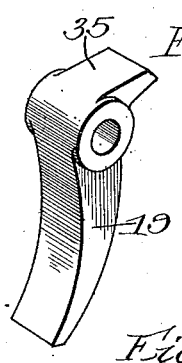
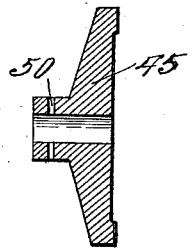
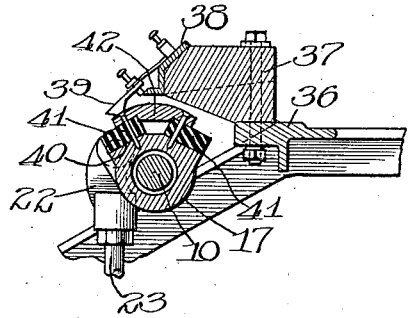
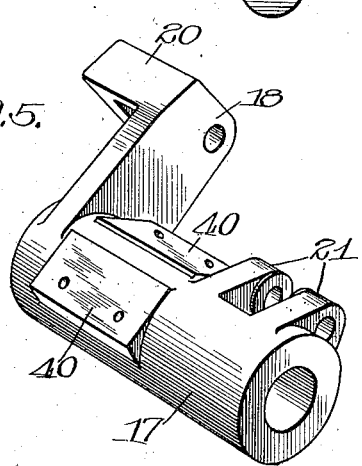
Witnesses:
Inventor:
Samuel F. Nichols
by Buckley Durand & Drury
attys

UNITED STATES PATENT OFFICE.

SAMUEL F. NICHOLS, OF CHICAGO, ILLINOIS.

MOTOR-OPERATED BRAKE MECHANISM.

1,029,883.

Specification of Letters Patent.

Patented June 18, 1912.

Application filed May 23, 1910. Serial No. 562,863.

*To all whom it may concern:*

Be it known that I, SAMUEL F. NICHOLS, a citizen of the United States of America, and resident of Chicago, Cook county, Illinois, have invented certain new and useful Improvements in Motor-Operated Brake Mechanism, of which the following is a specification.

My invention relates to improvements in mechanism, by means of which a quick release of brake mechanism can be effected, and has for its object the production of a device by means of which, when the power is cut off, the brake will be instantly set.

A further object is the provision of a device of simple mechanical construction that can readily be adapted to suit varying conditions, and one that is not liable to disarrangement of parts.

These and such other objects as may hereinafter appear are attained by my device, an embodiment of which is illustrated in the accompanying drawings, in which—

Figure 1 represents a top plan view of my device. Fig. 2 represents a side elevation of my device, with a portion of the frame broken away. Fig. 3 represents a side elevation of a portion of my device, showing the position the parts occupy when the brake is set. Fig. 4 represents an enlarged perspective view of the pawl. Fig. 5 represents an enlarged perspective view of the brake crank. Fig. 6 represents a sectional view of a portion of Fig. 1, showing details of the contact fingers. Fig. 7 represents an enlarged sectional view of the friction disk.

Like numerals of reference indicate like parts in the several figures of the drawings.

Referring now to the drawings: 7 represents a frame on which is mounted a motor 8 and a pair of parallel shafts 9—10, on which are keyed gear wheels 11—12. A pinion 13 on the motor shaft 14 meshes with the teeth of the gear wheel 11. The shaft 9 carries a pinion 15 meshing with the teeth of the gear wheel 12. Rigidly mounted near the opposite end of the shaft 10 is a ratchet wheel 16, and loosely mounted on the same shaft between the ratchet wheel 16 and the gear 12 is a brake crank 17. The brake crank 17 is provided with a crank arm on which is swingingly mounted a pawl 19, the crank arm being turned at 20 so that the pawl may engage the teeth of the ratchet wheel 16. A pair of parallel lugs or ears 21 also project from the brake crank between which is loosely journaled a brake T or casting 22. A connecting rod 23 is screwed into the free end of the T 22 and terminating in a clevis 24 connecting with any braking mechanism (not shown) with which my device may be associated. A spring 25 is mounted on the rod 23 below the frame, and is held from slipping by means of the nut 26 and a washer or head 27 is mounted on the top of the spring and adapted to limit the upward movement of the rod when the brakes are released. A spring 28 is secured to the pawl 19 and the crank arm 18 normally holding the pawl in engagement with the ratchet wheel.

A ratchet lever 29 is mounted in a bearing 30 on the frame. From the end of the horizontal arm 31 of the lever a pin 32 extends downwardly through the plate, and a spring 33 is mounted on this pin normally holding the arm 31 against the plate. The inner face of the ratchet lever is provided with ratchet teeth 34 adapted to be engaged by the extended arm 35 of the pawl 19.

Keyed to the intermediate shaft 9 inside the gear 11 is a friction disk 45 bearing against the inner face of the hub 46 of the gear wheel. On the outer end of the shaft is placed a spring 47, a washer 48 being interposed between the spring and the gear, and the spring is held in place and adjusted by means of an adjusting nut 49. The friction disk, as shown in Fig. 7, is preferably formed of brass and keyed in the shaft by a tapered pin passing through the key-way 50.

Referring now to the operation of my device: Let us consider the brake set as shown in Fig. 3, the rod 23 being down and the pawl 19 engaging the face of the ratchet wheel 16. The motor is set in operation, the direction of revolution being to the right. The shaft 10 carrying the ratchet wheel 16 revolves until the tooth 36 strikes the end of the pawl 19. The brake crank is now locked on the shaft 10, and as the shaft continues to revolve, the pawl and T are carried upwardly, the short arm 35 of the pawl forcing the ratchet lever to rock in its bearing, and the arm riding over the teeth 34. Just before the limit of upward motion is reached, the head 27 strikes the plate as shown in Fig. 2. The spring 25 is compressed and the pawl is held in rigid engagement with the ratchet. The spring 47 is set at the proper tension to make the friction clutch operative up to this point.

When, however, the upward motion of the rod is checked by the spring 25, and in the continued operation of the motor, the gear 11 turns slowly on the shaft 9; or if desired the friction may be made so great as to take up the torque of the motor. When the power is cut off, or if at any time the circuit is broken, the pull on the rod 23 forces the brake crank and arm backwardly, and the end 35 of the pawl engages one of the teeth 34, tripping the pawl out of engagement with the ratchet wheel. In this position the brake crank is loose on the shaft 10 and consequently instantly resumes the position shown in Fig. 3, setting the brake.

Referring now to Fig. 6: Mounted on the upper portion of the frame at 36 is a finger block 37, on which are mounted three finger supports 38 carrying contact fingers 39, 39$^a$ and 39$^b$. Mounted on sloping faces 40 of the brake crank 17 are a pair of insulating strips 41 on which a copper contact plate 42 is mounted. This plate has two of its diagonally opposite corners cut away, as shown at 43 and 44 in Fig. 1. As the brake crank is shifted, the contact finger 39 remains in contact with the plate 42, and constant electric current is maintained, any suitable source of current being used. The contact finger 39$^a$ is in circuit with, for instance, a red light, and the contact finger 39$^b$ with a white light, and as the brake crank is revolved on the shaft 10 the fingers 39$^a$ and 39$^b$ are alternately brought in contact with the contact plate, turning on first a red light and then a white light, and thus indicating to the operator whether the brake is on or off.

Without the interposition of a quick-release the movement would be very slow, as it would simply involve the reverse motion of the train of gears; but by the use of my device, the release is practically instantaneous, and this release is automatically effected in the event that the current is for any reason shut off or the circuit broken.

My device is especially valuable in connection with lift bridges, being located on the bridge and the rod 23 connected with the braking mechanism. The motor 8 is used solely to operate the release mechanism, but is in circuit with the main motor by means of which the bridge is operated and in the event that the main circuit is broken the release mechanism becomes operative, setting the brake and holding the bridge in whatever position it happens to be in when the accident occurs.

While I have shown specific means and mechanisms whereby the objects of my invention are accomplished, I do not limit myself to such precise mechanism, as other means may be used without departing from the spirit of my invention.

I claim:

1. In a device of the class described, the combination with a shaft and a source of power communicating therewith, a ratchet wheel rigidly mounted on said shaft, a brake crank loosely mounted on said shaft, means for throwing said crank into locking engagement with said ratchet, means mounted on said crank for transmitting power from said shaft, and means for throwing said crank and ratchet out of engagement, whereby said power transmitting mechanism is instantly returned to its normal position.

2. In a device of the class described, the combination with a source of power, a frame, a shaft mounted thereon, a ratchet wheel rigidly mounted on said shaft, a brake crank loosely mounted on said shaft, and means mounted on said crank, whereby said crank and shaft may be held in locking engagement, means mounted on said crank for transmitting power from said shaft, and means for throwing said crank and shaft out of locking engagement and causing said power transmitting mechanism to resume its normal position when the source of power is shut off.

3. In a device of the class described, a frame, a shaft mounted thereon, a source of power connected to said shaft, a ratchet wheel rigidly mounted thereon, a brake crank loosely mounted on said shaft, a T swingingly mounted on said crank, a brake connection secured thereto, a pawl mounted on said crank and normally held in engagement with said ratchet, whereby said brake connection is moved, and means for tripping said pawl when the source of power is shut off.

4. In a device of the class described, a frame, a shaft mounted thereon, a source of power connected to said shaft, a ratchet wheel rigidly mounted thereon, a brake crank loosely mounted on said shaft, a T swingingly mounted on said crank, a brake connection secured thereto, a pawl mounted on said crank and normally held in engagement with said ratchet, whereby said brake connection is moved, and means for tripping said pawl when the source of power is cut off, whereby said brake connection is instantly returned to normal position.

5. In a device of the class described, a frame, a shaft mounted thereon, a source of power connected to said shaft, a ratchet wheel rigidly mounted thereon, a brake crank loosely mounted on said shaft, a T swingingly mounted on said crank, a brake connection secured thereto, a pawl mounted on said crank and normally held in engagement with said ratchet, whereby said brake connection is moved, and a spring mounted ratchet lever for tripping said pawl when the source of power is for any reason cut off.

6. In a device of the class described, a frame, a shaft mounted thereon, a source of power connected to said shaft, a ratchet wheel rigidly mounted thereon, a brake crank loosely mounted on said shaft, a T swingingly mounted on said crank, a brake connection secured thereto, a pawl mounted on said crank and normally held in engagement with said ratchet, whereby said brake connection is moved, spring means for regulating the impact of said brake connection, and means for tripping said pawl when the source of power is for any reason cut off.

7. In a device of the class described, a frame, a shaft mounted thereon, a source of power connected to said shaft, a ratchet wheel rigidly mounted thereon, a brake crank loosely mounted on said shaft, a T swingingly mounted on said crank, a brake connection secured thereto, a pawl mounted on said crank and normally held in engagement with said ratchet, whereby said brake connection is moved, spring means surrounding said brake connection for regulating the impact thereof, and means for tripping said pawl when the source of power is for any reason cut off.

8. In a device of the class described, a frame, an operating shaft mounted thereon, an intermediate shaft, a source of power communicating therewith, a friction clutch mounted on said intermediate shaft, a ratchet wheel rigidly mounted on said operating shaft, a brake crank loosely mounted on said shaft, a brake connection secured thereto, a pawl mounted on said crank and normally held in engagement with said ratchet, whereby said brake connection is moved, and means for tripping said pawl when the source of power is for any reason cut off, whereby said brake connection is instantly returned to normal position.

9. In a device of the class described, a frame, an operating shaft mounted thereon, an intermediate shaft geared thereto, a gear wheel loosely mounted thereon, means for imparting power to said wheel, a friction clutch for holding said gear rigid on said shaft against a predetermined force, means mounted on said operating shaft for transmitting power therefrom, and means whereby the cutting off of the source of power causes said power transmitting mechanism to instantly resume its normal position.

Signed by me at Chicago, Illinois, this 19th day of April, 1910.

SAMUEL F. NICHOLS.

Witnesses:
 WM. B. DURNION,
 ROSE SEHNEM.

Copies of this patent may be obtained for five cents each, by addressing the "Commissioner of Patents, Washington, D. C."